United States Patent Office 3,271,388
Patented Sept. 6, 1966

3,271,388
AMYLOPECTIN SULFATES
Peter S. Cammarata and Stephen Eich, Skokie, Ill., assignors to G. D. Searle & Co., Chicago, Ill., a corporation of Delaware
No Drawing. Filed June 29, 1964, Ser. No. 379,035
Claims priority, application Great Britain, Mar. 17, 1964, 11,272/64
5 Claims. (Cl. 260—233.5)

This application is a continuation-in-part of our copending application Serial Number 269,162, filed March 29, 1963, and now abandoned.

The present invention is concerned with novel sulfated polysaccharides and, more particularly, with sulfates derived from the amylopectin fraction of starch. These derivatives are particularly useful in view of their potent pepsin-inhibitory and anti-ulcerogenic properties. They possess also some anti-coagulant activity but are lacking in significant anti-lipemic properties.

Starch may be derived from a variety of natural sources such as corn, potatoes, maize, peas, and wheat. From a chemical standpoint, starch can be characterized as a high molecular weight homopolymer, in which the repeating moiety is a glucose unit. That portion of starch possessing only linear polymeric chains is designated as amylose while the fraction containing also branched chains has been named amylopectin. Amylose and amylopectin are not, however, distinct entities, their physicochemical characteristics being dependent upon the source and also upon the fractionation method used for their separation. A specific characteristic contemplated is size of the molecule, indicated, for example, by measurements of molecular weight and molecular shape. Molecular weight data are obtained by light scattering measurements. In addition, further characterization is obtained by viscosity measurements.

Of the polymeric chains constituting the amylopectin molecule, approximately 2–4% are branched. The maximum number of hydroxy groups available for sulfation is thus very close to three. By the proper selection of conditions, however, it has been found possible to control the degree of sulfation so that from one to approximately 1.8 sulfate groups per glucose unit are introduced. Suitable sulfating agents for the preparation of the instant derivatives are exemplified by chlorosulfonic acid-pyridine, pyridine-sulfur trioxide, chlorosulfonic acid-formamide, sulfur trioxide in sulfur dioxide, sulfamic acid, sulfur trioxide-aliphatic tertiary amine complexes such as sulfur trioxide-trimethylamine, and sulfur trioxide-ether complexes such as sulfur trioxide-dioxane. Other reaction variables such as ratio of sulfating agent to polysaccharide, time, temperature and pH are also important factors in determining the compositon of the product.

In choosing the amylopectin starting material, it has been determined that molecular weight and degree of depolymerization suffered during the fractionation process are particularly significant criteria. A molecular weight in the range of $1-30 \times 10^7$ is preferred. The expression "molecular weight" as used in this application refers to weight-average molecular weight. The amylopectin derived from potato starch by selective precipitation with certain inorganic salts, as is described in U.S. Patent 2,829,987, possesses a molecular weight of about $6 \times 10^7$ and serves as an especially preferred starting material. The preferred sulfated products of this invention are characterized by a molecular weight in that same range as a result of sulfating conditions involving minimum degradation. Starch fractions of lower molecular weight, e.g., those containing greater proportions of amylose, afford products less desirable for the purposes of the present invention.

An example of a suitable process for the sulfation of this especially preferred starting material is the reaction with chlorosulfonic acid and pyridine at about 70° for about 2 hours. Decantation of the supernatant affords the crude sulfate which is purified by dissolution in water, conversion to the sodium salt by addition of aqueous sodium hydroxide, and precipitation with isopropyl alcohol. The sodium salt thus obtained contains about 1.8 sulfate groups per glucose unit. Determination of its molecular weight by the light scattering method, using techniques wherein the total sample is solubilized and refined calculation procedures are employed, results in a value approaching 125 million. A particularly convenient sulfation process involves the use of sulfur trioxide-trimethylamine. Temperatures from 0–100° C. may be utilized, although room temperature is quite suitable and especially convenient from the standpoint of economy of operation and also in view of the minimal hydrolytic depolymerization resulting. Reaction at room temperature for about 18 hours, then at about 50° for about 5 hours affords a sulfate characterized by a molecular weight of about $6.3 \times 10^7$ and by a sulfate content of about 1.7 sulfate groups per glucose unit. The reaction time is, of course, dependent upon the reaction temperature employed and may vary from 2 to 100 hours as the temperature varies within the aforementioned 0–100° C. range.

The sulfates of the present invention are conveniently isolated in the form of their ammonium and alkali metal, i.e., sodium, potassium, and lithium, salts. Salts with organic amines such as trimethylamine and triethylamine are likewise suitable. These salts possess the particular advantages of enhanced stability, ready water solubility and high degree of potency as pepsin-inhibitory and anti-ulcerogenic agents. With regard to water solubility, an important feature of the instant compounds, it is of interest to note that sulfated derivatives possessing a higher degree of sulfation and prepared under more vigorous reaction conditions, for example the substances described by P. Bernfeld, J. Biol. Chem., 235, 2853 (1960), are poorly water soluble and, therefore, unsuitable for the purposes of this invention.

The especially preferred sodium salts of this invention possess from one to about 1.8 sulfate groups per glucose unit or, expressing the sulfate content in another manner, from about 12 to 16.5 percent sulfur.

Procedures which may be utilized, either separately or in combination, for isolation and purification of the instant sulfated amylopectins include centrifugation, alcohol precipitation, dialysis, lyophilization, spray-drying and drum-drying.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.) and quantities of materials in parts by weight unless otherwise noted.

Example 1

To 75.7 parts of pyridine is added, at 10–20° over a period of about 2 hours, 12 parts of chlorosulfonic acid. After completion of the addition, the mixture is heated to about 70°, and 2 parts of potato starch amylopectin is added with stirring. Heating and stirring are continued for about 2 hours, after which time agitation is stopped, and the mixture is allowed to stand in order to permit the product to settle. The hot supernatant layer is then removed by decantation and discarded. Approximately 68 parts of water followed by sufficient concentrated hydrochloric acid to afford a pH of approximately 2 are then added, and the resulting aqueous acidic mixture is poured, carefully with vigorous stirring, into 163.5 parts of isopropyl alcohol. At the end of approximately 30 minutes, stirring is discontinued, and the precipitate is allowed to settle. The supernatant liquid is decanted and discarded, and approximately 56.8 parts of water is added. Stirring is continued until solution is complete, after which time sufficient 10% aqueous sodium hydroxide to afford a pH of about 6.25 is added. This alkaline solution is added to approximately 163.5 parts of isopropyl alcohol, then is stirred for about 10 minutes, following which time the precipitate is allowed to settle and the supernatant liquid is separated by decantation. That precipitate is then diluted with approximately 38 parts of water, and the resulting mixture is stirred for about 16 hours. The pH is adjusted to approximately 8.5 by the addition of 10% aqueous sodium hydroxide, and this alkaline solution is added to approximately 163.5 parts of isopropyl alcohol at a temperature of about 10°. After stirring for about 15 minutes and standing for about 10 minutes, the supernatant isopropanolic solution is decanted and discarded, and the precipitate is stirred with approximately 56.8 parts of water. Clarification of this aqueous mixture by centrifugation, followed by spray drying affords the sodium salt of sulfated potato starch amylopectin possessing about 1.8 sulfate groups per glucose unit. It has a molecular weight of about 125 million, as determined by the light scattering method.

*Example 2*

To 284 parts of pyridine is added, dropwise with stirring, 18 parts of chlorosulfonic acid, keeping the temperature at about 50°. The temperature is then raised to about 77°, and 7 parts of potato starch amylopectin is added. Stirring and heating are continued for approximately 3 hours longer, at the end of which time the reaction mixture is allowed to stand in order to permit the insoluble material to settle. The supernatant pyridine solution is removed by decantation, and the remaining solid is dissolved in approximately 200 parts of water. This aqueous solution is made acidic to pH 1.6 by the addition of concentrated hydrochloric acid, then is poured into approximately 1280 parts of ethanol. The resulting mixture is allowed to stand at 0–5° for about 16 hours. Decantation of the supernatant affords a solid residue which is dissolved in 200 parts of water. This aqueous solution is made alkaline to a pH of approximately 9 by the addition of dilute aqueous sodium hydroxide, and a portion of that solution is lyophilized to afford the sodium salt of potato starch amylopectin having approximately 1.24 sulfate groups per glucose unit. The remainder of that aqueous solution is clarified by centrifugation at approximately 3600 revolutions per minute for about 90 minutes, and the resulting solution is dried by lyophilization to afford the sodium salt of potato starch amylopectin containing approximately 1.57 sulfate groups per glucose unit.

Lyophilization of a suspension of the remaining residue affords the sodium salt of sulfated potato starch amylopectin containing substantially one sulfate group per glucose unit.

*Example 3*

An aqueous solution of one part of the sodium salt of sulfated potato starch amylopectin, prepared according to the processes of Example 1, in 20 parts of water is dialyzed, at 0–5°, against 4000 parts by volume of 4 molar ammonium chloride for about 16 hours, then against 16,000 parts of distilled water for about 16 hours. Lyophilization of the aqueous solution affords the ammonium salt of sulfated potato starch amylopectin containing approximately 1.8 sulfate groups per glucose unit.

*Example 4*

To a suspension of 100 parts of potato starch amylopectin in 200–800 parts of water is added successively 25–50 parts of 10%–50% aqueous sodium hydroxide and 100–400 parts of the sulfur trioxide-trimethylamine complex. The reaction mixture is stirred vigorously for about 12–24 hours at room temperature, then at 40–60° for 1–15 hours. The resulting mixture is then purified by one, or a combination of the methods hereinbefore described, to afford the sodium salt of sulfated potato starch amylopectin containing substantially one to 1¾ sulfate groups per glucose unit.

When 100 parts of potato starch amylopectin, 600 parts of water, 35 parts of 10% aqueous sodium hydroxide, and 300 parts of the sulfur trioxide-trimethylamine complex are allowed to react by the latter process for a period of about 18 hours at room temperature, followed by 5 hours at about 50°, and the product is purified by dialysis and isolated by spray-drying, the sodium salt of sulfated potato starch amylopectin containing substantially 1.7 sulfate groups per glucose unit is obtained. This substance is characterized by a molecular weight of approximately $6.3 \times 10^7$, as determined by the light-scattering method. A 0.5% solution in distilled water, at 20° C., exhibits an absolute viscosity of 11.25 centipoises, when measured by the method of Höppler, World Petroleum Congress London Proc., 2, 503 (1933).

What is claimed is:

1. A pepsin inhibitory and anti-coagulant but not significantly anti-lipemic compound selected from the class consisting of sulfated potato starch amylopectins and the highly and instantly water soluble ammonium, alkali metal and aliphatic amine salts thereof, said derivatives possessing about 1–1.8 sulfate groups per glucose unit and characterized also by a molecular weight of $1-30 \times 10^7$.

2. A pepsin inhibitory and anti-coagulant but not significantly anti-lipemic compound selected from the class consisting of sulfated potato starch amylopectins and the highly and instantly water soluble ammonium, alkali metal and aliphatic amine salts thereof, said derivatives possessing about 1–1.8 sulfate groups per glucose unit and characterized also by a molecular weight of about $6 \times 10^7$.

3. A pepsin inhibitory and anti-coagulant but not significantly anti-lipemic compound selected from the class consisting of sulfated potato starch amylopectins and the highly and instantly water soluble sodium salts thereof, said derivatives possessing about 1–1.8 sulfate groups per glucose unit and characterized also by a molecular weight of $1-30 \times 10^7$.

4. A pepsin inhibitory and anti-coagulant but not significantly anti-lipemic sodium salt of a potato starch amylopectin, said sodium salt possessing about 1.8 sulfate groups per glucose unit and characterized also by a molecular weight of about $12.5 \times 10^7$.

5. A pepsin inhibitory and anti-coagulant but not significantly anti-lipemic sodium salt of a potato starch amylopectin, said sodium salt possessing about 1.7 sulfate groups per glucose unit and characterized also by a molecular weight of about $6.3 \times 10^7$.

References Cited by the Examiner

UNITED STATES PATENTS 2,829,987   4/1958   Bus et al. _____ 127—71
2,885,586   5/1959   Paschall _____ 260—233.5

OTHER REFERENCES

Bernfeld et al.: Journal of Biological Chemistry, vol. 235, No. 10, p. 2852 (1960).

LEON J. BERCOVITZ, *Primary Examiner.*

DONALD E. CZAJA, *Examiner.*

R. W. MULCAHY, *Assistant Examiner.*